United States Patent [19]

Yamamoto et al.

[11] Patent Number: 5,809,445

[45] Date of Patent: *Sep. 15, 1998

[54] TOTAL GRIP FORCE ESTIMATING SYSTEM FOR VEHICLE, AND SLIP CONTROL SYSTEM FOR VEHICLE

[75] Inventors: Osamu Yamamoto; Shuji Shiraishi, both of Wako; Osamu Yano, Takanezawa-machi, all of Japan

[73] Assignee: Honda Giken Kogyo Kabushiki Kaisha, Tokyo, Japan

[*] Notice: The term of this patent shall not extend beyond the expiration date of Pat. No. 5,652,383.

[21] Appl. No.: 573,268

[22] Filed: Dec. 15, 1995

[30] Foreign Application Priority Data

Dec. 16, 1994 [JP] Japan ................................ 6-312879

[51] Int. Cl.⁶ .................................................... G06G 7/70
[52] U.S. Cl. .............................. 701/74; 701/70; 701/71; 701/80; 180/197
[58] Field of Search ...................... 364/426.01, 426.029, 364/426.031, 426.03, 426.016, 426.036, 426, 424.045, 431.03; 280/707, 840, 689, 703; 180/197, 282, 177; 303/141

[56] References Cited

U.S. PATENT DOCUMENTS

| | | |
|---|---|---|
| 4,762,196 | 8/1988 | Harada et al. ........................... 180/197 |
| 4,825,367 | 4/1989 | Nagaoka et al. .................. 364/424.051 |
| 4,884,651 | 12/1989 | Harada et al. ........................... 180/197 |
| 4,981,190 | 1/1991 | Nakayama et al. ...................... 180/197 |
| 5,172,319 | 12/1992 | Shiraishi et al. .................. 364/426.036 |
| 5,181,175 | 1/1993 | Shiraishi et al. .................. 364/426.036 |
| 5,197,008 | 3/1993 | Itoh et al. ........................... 364/426.01 |
| 5,243,526 | 9/1993 | Ito et al. .......................... 364/426.036 |
| 5,255,192 | 10/1993 | Ito et al. .......................... 364/426.016 |
| 5,450,919 | 9/1995 | Shitani ................................... 180/233 |
| 5,472,061 | 12/1995 | Shiraishi et al. .................. 364/429.029 |
| 5,490,070 | 2/1996 | Kiryu et al. ........................ 364/426.01 |
| 5,539,643 | 7/1996 | Yamamoto et al. ............... 364/426.01 |
| 5,555,499 | 9/1996 | Yamashita et al. .............. 364/426.029 |
| 5,652,383 | 7/1997 | Yamamoto ............................. 180/197 |

*Primary Examiner*—Jacques H. Louis-Jacques
*Attorney, Agent, or Firm*—Armstrong, Westerman, Hattori, McLeland & Naughton

[57] ABSTRACT

A slip rate of the driven wheel is calculated (at step S1). When the slip rate is smaller and when the slip rate is larger (at steps S2 and S3), estimated road surface friction coefficients MUTG and MUFG are determined by searching a table, based on a total grip force TGS or a longitudinal grip force FG determined from a vehicle acceleration (at steps S4, S7, S5 and S9). The larger one of the estimated road surface friction coefficients MUTG and MUFG is selected as MUCON (at steps S10, S11 and S12). A minimum total grip force TGMIN determined by searching a table and based on MUCON is compared with the total grip force TGS determined from the vehicle acceleration (at step S13), and the larger one of the minimum total grip force TGMIN and total grip force TGS is delivered as a total grip force TG for traction control (at steps S14 and S15). Thus, it is possible to estimate a correct total grip force, taking the road surface friction coefficient into consideration.

3 Claims, 5 Drawing Sheets

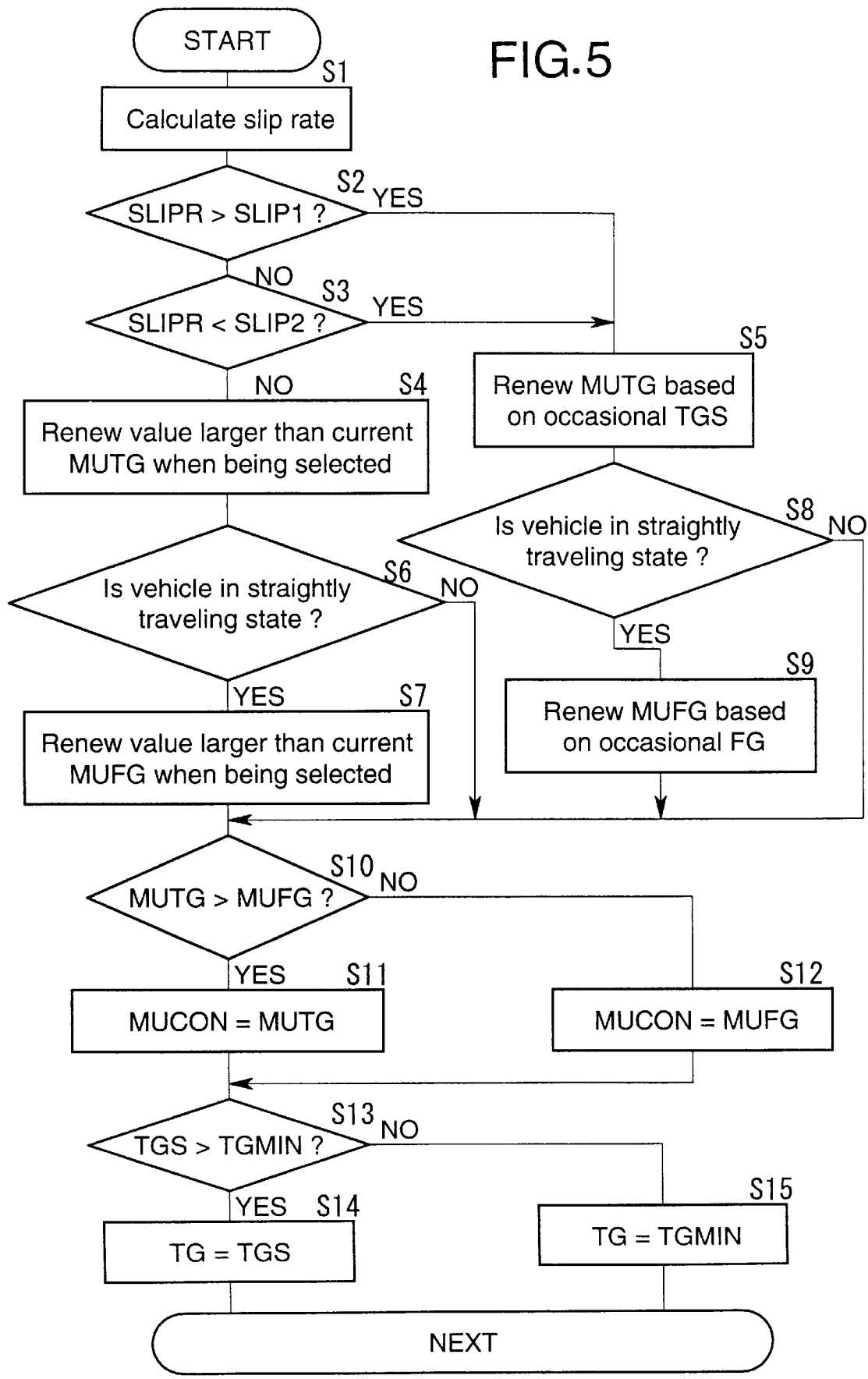

TOTAL GRIP FORCE ESTIMATING SYSTEM FOR VEHICLE, AND SLIP CONTROL SYSTEM FOR VEHICLE

BACKGROUND OF THE INVENTION

1. Field Of The Invention

The present invention relates to a total grip force estimating system for a vehicle for estimating a total grip force of driven wheels, and further to a slip control system using the total grip force estimating system.

2. Description Of The Prior Art

The grip force of the driven wheels means a torque transmitted onto a road surface, and the magnitude of the torque is proportional to the magnitude of the acceleration of the vehicle. Therefore, the total grip force of the driven wheels is provided as a vector sum of a longitudinal acceleration and a lateral acceleration of the vehicle.

A vector sum of a longitudinal acceleration and a lateral acceleration is a driving force which the driven wheels (i.e., the vehicle) can transmit to the road surface. In the prior art, such vector sum has been used as a total grip force of the driven wheel of the vehicle.

The estimation of the total grip force in the prior art does not take the road surface friction coefficient into consideration and hence, there is a problem that if there is no large longitudinal acceleration and no lateral acceleration generated even on a road surface having a high road surface friction coefficient, it is decided that the total grip force is small. For this reason, when the vehicle travels on a road surface having a high road surface friction coefficient, there is a possibility that appropriate values are not obtained as a limit value of a target driven wheel torque determined based on the total grip force and as each gain of a PID control, thereby obstructing an accurate slip control for the driven wheels.

SUMMARY OF THE INVENTION

Accordingly, it is an object of the present invention to estimate a correct total grip force, taking a road surface friction coefficient into consideration, and to appropriately inhibit an excessive slip of the driven wheels.

To achieve the above object, according to the present invention, there is provided a total grip force estimating system for a vehicle, comprising: a total grip force detecting means for detecting, as a first total grip force, an acceleration of the vehicle from longitudinal and lateral accelerations; a total grip force estimating means for estimating a second total grip force, taking a road surface friction coefficient into consideration, based on a variation in the acceleration of the vehicle; and a selecting means for selecting the larger one of the first and second total grip forces as a total grip force.

With the above arrangement, even when the actual total grip force is larger than the first total grip force which is the acceleration of the vehicle, because of a high road surface friction coefficient, the total grip force can be correctly estimated.

In addition, to achieve the above object, according to the present invention, there is provided a slip control system for a vehicle, comprising: a driven wheel speed calculating means for calculating a speed of a driven wheel of the vehicle; a follower wheel speed calculating means for a calculating a speed of a follower wheel of the vehicle; a slipping-state determining means for determining a slipping state of the driven wheel by comparing a slip rate of the driven wheel calculated from the driven wheel speed and the follower wheel speed with a target slip rate; and an engine output control means for controlling an engine output based on the slipping state of the driven wheel, the slip control system further including a total grip force detecting means for detecting, as a first total grip force, an acceleration of the vehicle from longitudinal and lateral accelerations, a total grip force estimating means for estimating a second total grip force, taking a road surface friction coefficient into consideration, based on a variation in acceleration of the vehicle, and a selecting means for selecting the larger one of the first and second total grip forces as a total grip force, the target slip rate being corrected based on the selected total grip force.

With the above arrangement, it is possible to effect an accurate slip control for the driven wheels in accordance with the road surface friction coefficient.

In this case, the second total grip force can be correctly calculated from the longitudinal and lateral accelerations, taking the road surface friction coefficient into consideration.

The above and other objects, features and advantages of the invention will become apparent from the following description of a preferred embodiment taken in conjunction with the accompanying drawings.

BRIEF DESCRIPTION OF THE DRAWINGS

FIG. 5 is a flow chart for estimating a total grip force.

DESCRIPTION OF THE PREFERRED EMBODIMENT

Figure 1:
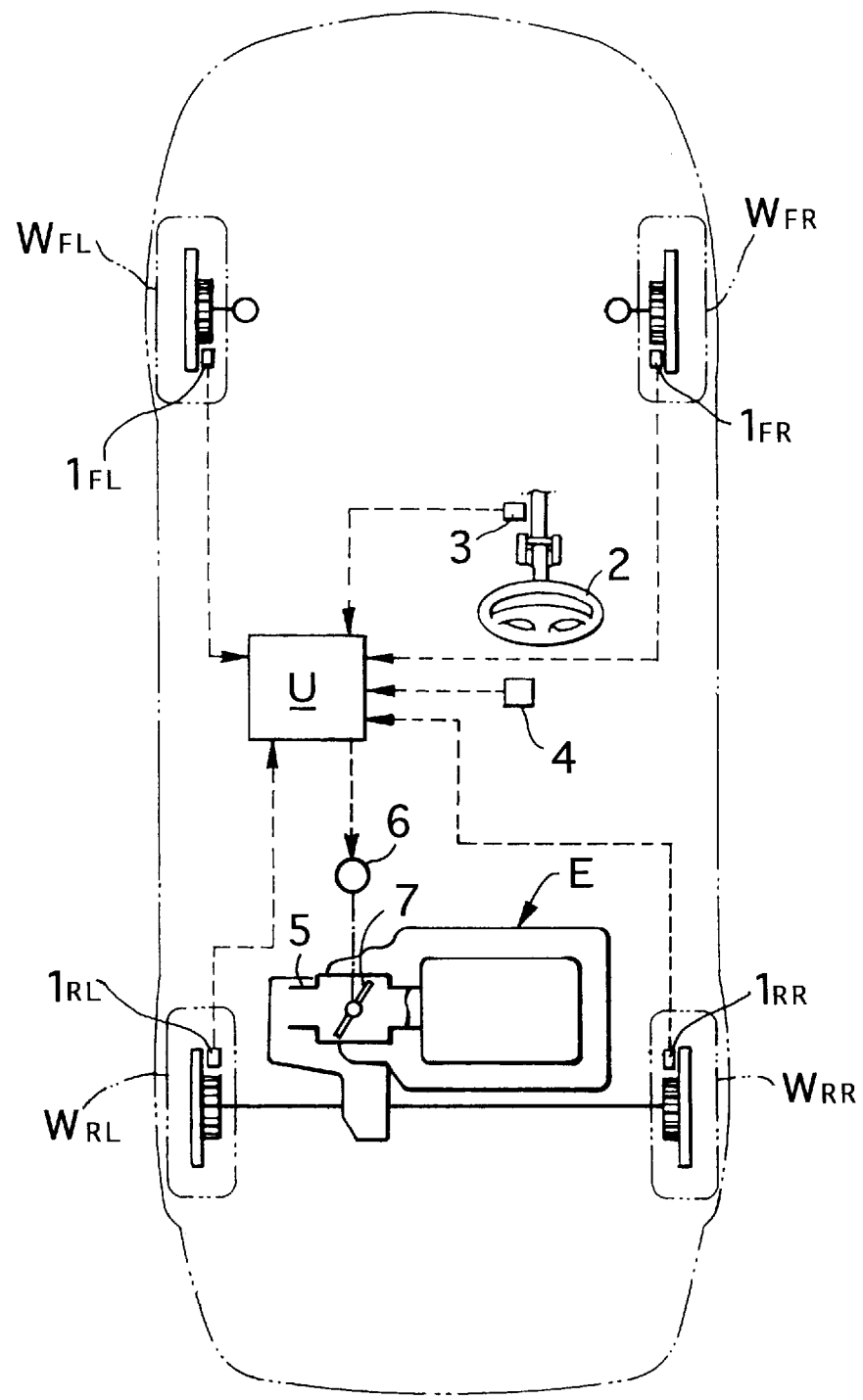
FIG. 1 is a diagrammatic illustration of a vehicle including a traction control system, to which a preferred embodiment of the present invention is applied.

Referring to FIG. 1, there is shown a vehicle which is a rear wheel drive vehicle and includes a pair of left and right driven wheels $W_{RL}$ and $W_{RR}$ driven by an engine E, and a pair of left and right follower wheels $W_{FL}$ and $W_{FR}$. Driven wheel speed detecting means $1_{RL}$ and $1_{RR}$ are mounted on the driven wheels $W_{RL}$ and $W_{RR}$, respectively, and follower wheel speed detecting means $1_{FL}$ and $1_{FR}$ are mounted on the follower wheels $W_{FL}$ and $W_{FR}$, respectively.

A steering angle detecting means 3 for detecting a steering angle δ is mounted on a steering wheel 2, and a lateral acceleration detecting means 4, for detecting a lateral acceleration LG, is mounted in place on a vehicle body. A throttle valve 7 is mounted in an intake passage 5 in the engine E, and is connected to and opened and closed by a pulse motor 6.

The driven wheel speed detecting means $1_{RL}$ and $1_{RR}$, the follower wheel speed detecting means $1_{FL}$ and $1_{FR}$, the steering angle detecting means 3, the lateral acceleration detecting means 4 and the pulse motor 6 are connected to an electronic control unit U, including a computer.

Figure 2:
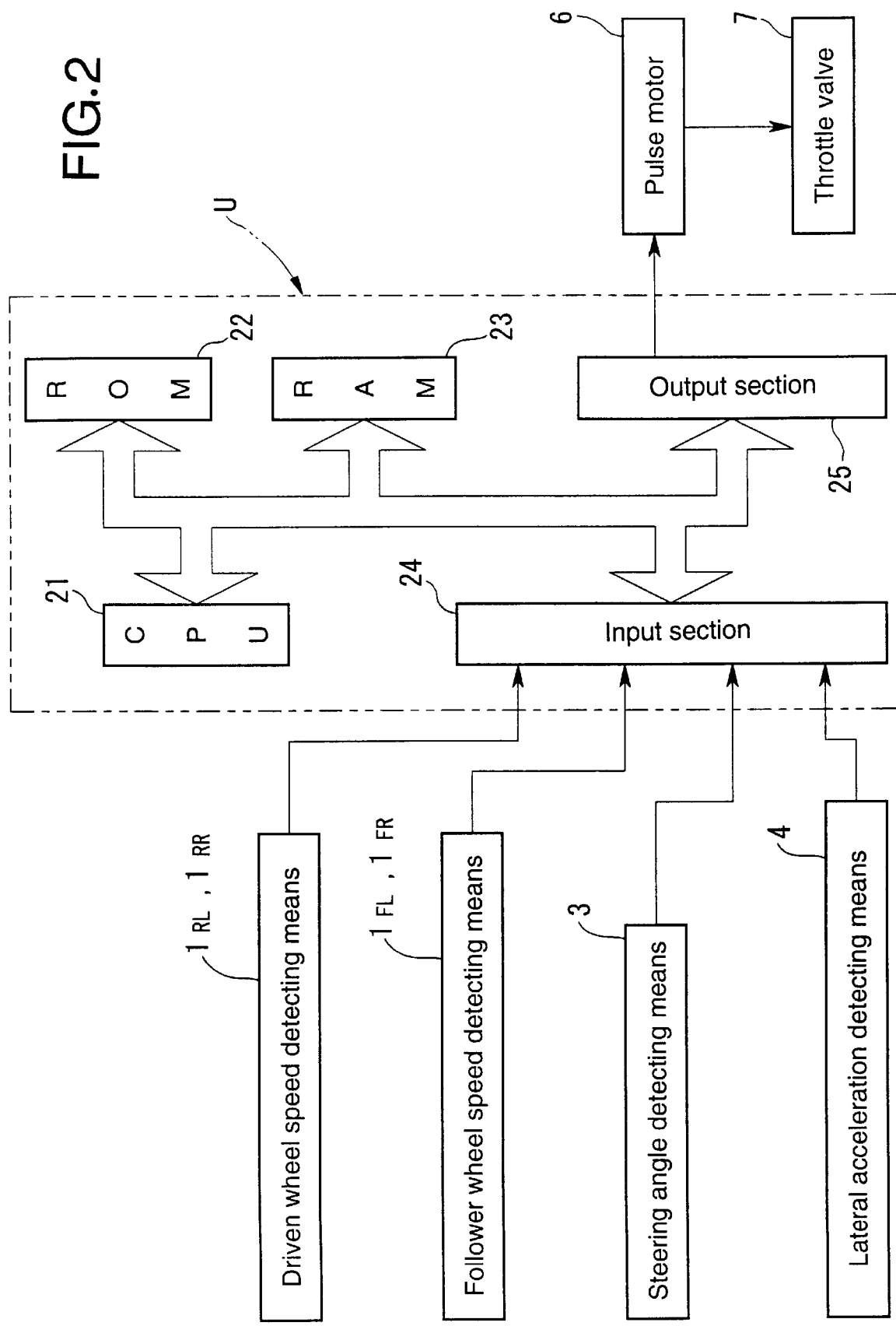
FIG. 2 is a block diagram of a control system.

FIG. 2 shows the electronic control unit U for controlling the output from the engine E by arithmetically processing signals from the detecting means based on a control program and driving the throttle valve 7 by the pulse motor 6, so that when an excessive slip of the driven wheels $W_{RL}$ and $W_{RR}$ has been detected, such excessive slip is inhibited. The electronic control unit U includes a central processing unit (CPU) 21 for conducting the arithmetic processing, a read only memory (ROM) 22 having the control program and data such as various maps stored therein, a random access memory (RAM) 23 for temporarily storing the signals from the detecting means and arithmetic results, an input section 24 to which the various detecting means, i.e., the driven wheel speed detecting means $1_{FL}$ and $1_{FR}$, the steering angle detecting means 3 and the lateral acceleration detecting means 4 are connected, and an output section 25 to which the pulse motor 6 is connected. Thus, the electronic control unit U arithmetically processes, in central processing unit 21, various signals received through the input section 14, the data stored in the read only memory 22 and the like, based on the control program, which will be described hereinafter and finally drives the pulse motor 6 through the output section 25. This causes the throttle valve 7 to be controlled to change the output from the engine E, thereby inhibiting the excessive slip of the driven wheels $W_{RL}$ and $W_{RR}$.

Figure 3:
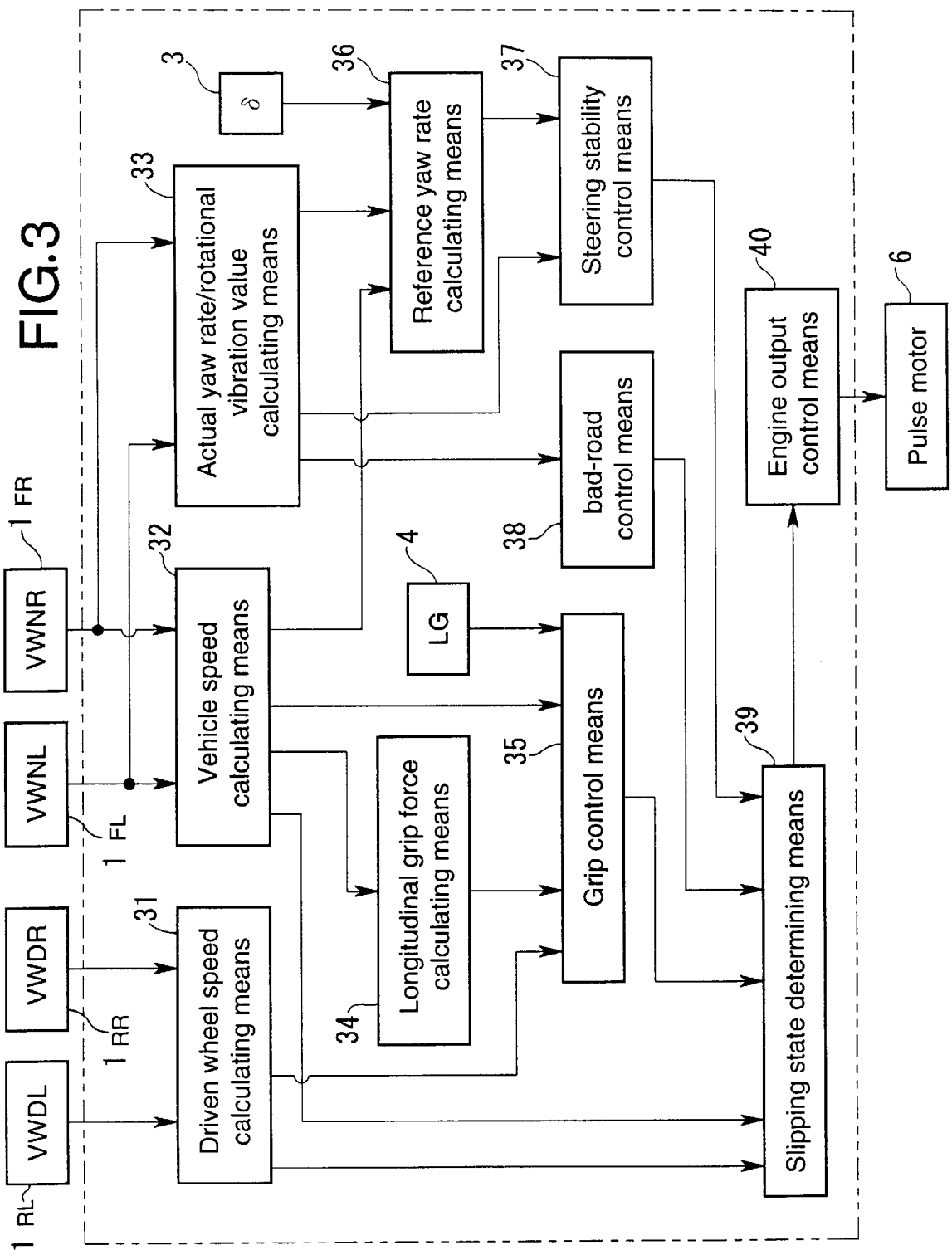
FIG. 3 is a block diagram illustrating a circuit arrangement of an electronic control unit.

The outline of a traction control system will be described below with reference to FIG. 3.

Output signals VWDL and VWDR from the left and right driven wheel speed detecting means $1_{RL}$ and $1_{RR}$ are supplied to a driven wheel speed calculating means 31, where a driven wheel speed VWNHOS is determined as an average value of the output signals VWDL and VWDR from the left and right driven wheel speed detecting means $1_{RL}$ and $1_{RR}$. In addition, output signals VWNL and VWNR from the left and right follower wheel speed detecting means $1_{FL}$ and $1_{FR}$ are supplied to a vehicle speed calculating means 32, where a follower wheel speed VVNHOS is determined as an average value of the output signals VWNL and VWNR from the left and right follower wheel speed detecting means $1_{FL}$ and $1_{FR}$, and defined as a vehicle speed VVN. Further, the output signals VWNL and VWNR from the left and right follower wheel speed detecting means $1_{FL}$ and $1_{FR}$ are also supplied to an actual yaw rate/rotational vibration value calculating means 33, where an actual yaw rate Y and a rotational vibration ΔV determined based on a difference between the follower wheel speeds, which is a deviation between the output signals VWNL and VWNR from the left and right follower wheel speed detecting means $1_{FL}$ and $1_{FR}$.

The vehicle speed VVN determined in the vehicle speed calculating means 32 is supplied to a longitudinal grip force calculating means 34, where a longitudinal grip force FG is calculated as a time differentiation value of the vehicle speed VVN.

The longitudinal grip force FG delivered by the longitudinal grip force calculating means 34 and the lateral acceleration LG of the vehicle delivered by the lateral acceleration detecting means 4 are supplied to a grip control means 35, where a total grip force TGS is determined as a vector sum of the longitudinal grip force FG and the lateral acceleration LG. Further, in the grip control means 35, a final total grip force TG, taking a road surface friction coefficient into consideration, is determined based on the total grip force TGS, the longitudinal grip force FG, the vehicle speed VVN and the driven wheel speed VWNHOS. The function of the grip control means 35 will be described in detail hereinafter.

The steering angle δ delivered by the steering angle detecting means 3 and the vehicle speed VVN delivered by the vehicle speed calculating means 32 are supplied to a reference yaw rate calculating means 36, where a reference yaw rate $Y_{REF}$, which is a yaw rate to be intrinsically generated by the vehicle in accordance with the operational state, is determined. The reference yaw rate $Y_{REF}$ delivered by the reference yaw rate calculating means 36 and the actual yaw rate Y delivered by the actual yaw rate calculating means 33 are supplied to a steering stability control means 37, where it is determined whether the vehicle is in an oversteering state or an understeering state.

A rotational vibration value ΔV delivered by the actual yaw rate/rotational vibration value calculating means 33 is supplied to a bad-road control means 38, where it is determined, based on the magnitude of the rotational vibration value ΔV, whether a road on which the vehicle is now traveling is a bad road.

The driven wheel speed VWNHOS delivered by the driven wheel speed calculating means 31 and the vehicle speed VVN delivered by the vehicle speed calculating means 32 are supplied to a slipping-state determining means 39, where a target slip rate is determined which is a target value to which the slip rate of the driven wheels $W_{RL}$ and $W_{RR}$ calculated from the driven wheel speed VWNHOS and the vehicle speed VVN is reduced when it exceeds a predetermined value. In this case, the target slip rate is corrected in accordance with the total grip force TG delivered by the grip control means 35, the steered state delivered by the steering stability control means 37, and the road surface condition delivered by the bad-road control means 38.

More specifically, when the total grip force TG is large, the target slip rate is corrected to a larger value, whereby a sporty travel is possible without damaging the slip control function for the driven wheels $W_{RL}$ and $W_{RR}$. Even in the case of a bad road, on which the driven wheels are difficult to slip, the target slip rate is corrected to a larger value. Further, this vehicle is a rear wheel drive vehicle and hence, when the vehicle is in an oversteered state, the target slip rate is corrected to a smaller value, and when it is in an understeered state, the target slip rate is corrected to a larger value, thereby preventing the vehicle from spinning around in an undesirable direction.

The output from the engine E is reduced based on the target slip rate delivered by the slipping-state determining means 39 by driving the pulse motor 6 from the engine output control means 40 to regulate the opening degree of the throttle valve 7. As a result, the slip rate of the driven wheels $W_{RL}$ and $W_{RR}$ converges to the target slip rate, whereby the excessive slip of the driven wheels $W_{RL}$ and $W_{RR}$ is inhibited.

Figure 4:
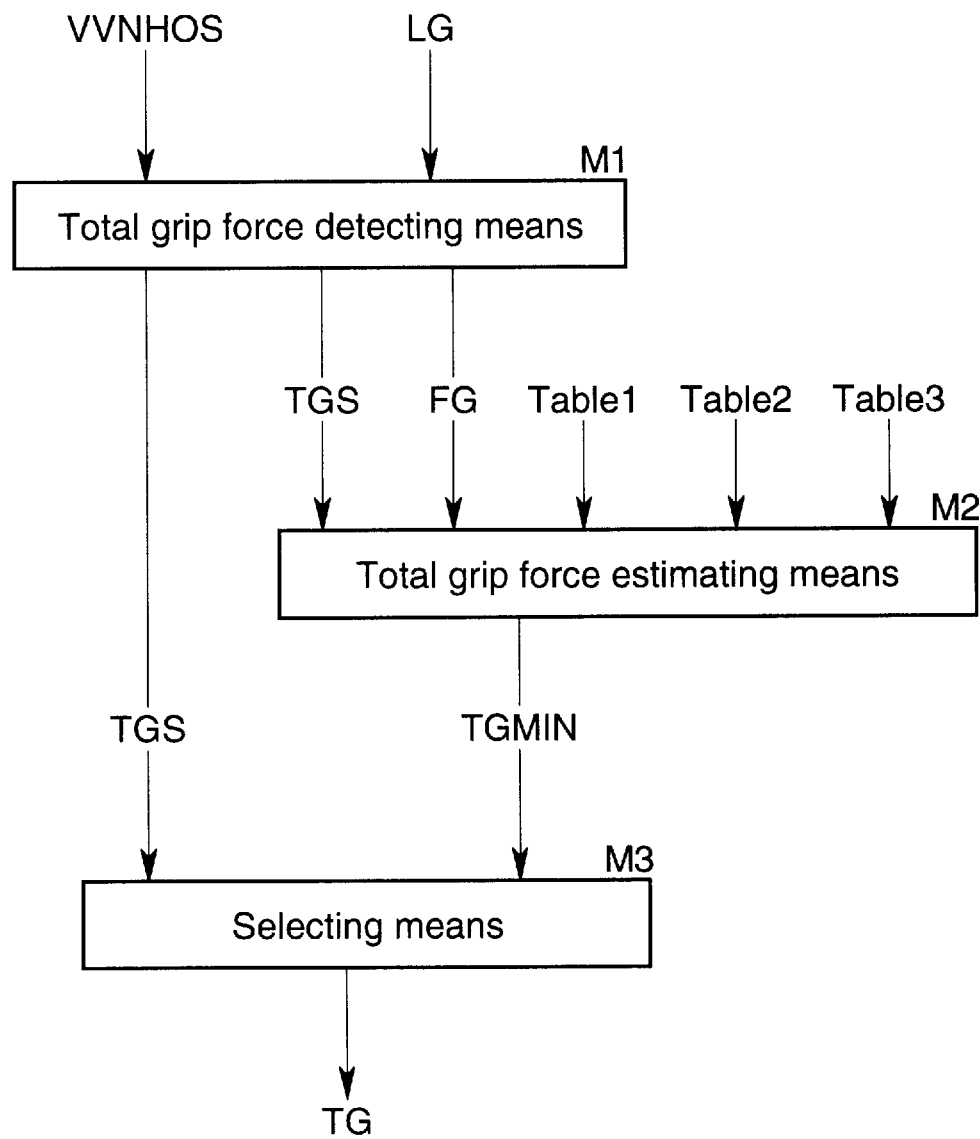
FIG. 4 is a block diagram of a total grip force calculating means.

The function of the grip control means 35 shown in the block diagram in FIG. 3 will be described below with reference to the block diagram in FIG. 4 and the flow chart in FIG. 5.

In a total grip force estimating means M2, steps S1 to S12 are carried out. First, a slip rate SLIPR of the driven wheels $W_{RL}$ and $W_{RR}$ is calculated based on the vehicle speed VVN and the driven wheel speed VWNHOS according to a following equation (at step S1):

$$SLIPR=(VWNHOS-VVN)/VWNHOS$$

The slip rate SLIPR may be calculated according to the following equation:

$$SLIPR=(VWNHOS-VVN)/VVN$$

It is determined whether the slip rate SLIPR is larger than a preset positive (i.e., in a direction of more rotations of the driven wheels $W_{RL}$ and $W_{RR}$ than those of the follower wheels $W_{FR}$ and $W_{FL}$) threshold value SLIP1 (at step S2).

If the answer at step S2 is NO to indicate SLIPR≦SLIP1, it is determined whether the slip rate SLIPR is smaller than a preset negative (i.e., in a direction of less rotations of the driven wheels $W_{RL}$ and $W_{RR}$ than those of the follower wheels $W_{FR}$ and $W_{FL}$) threshold value SLIP2 (at step 3). If the answer at step S3 is NO to indicate SLIPR≧SLIP2, i.e., when SLIP2<SLIPR<SLIP1, it is decided that the vehicle is in a state before the starting of a traction control, progressing to step S4, when the positive and negative slip rate is relatively small and fallen between the two threshold values SLIP1 and SLIP2.

On the other hand, if the answer at step S2 is YES to indicate SLIPR>SLIP1, or if the answer at step S3 is YES to indicate SLIPR<SLIP2, it is decided that the positive or negative slip rate SLIPR is relatively large and vehicle is in a state after the starting of the traction control, progressing to step S5.

At step S4, an estimated road surface friction coefficient MUTG is searched from Table 1 stored in the read only memory 22, based on the total grip force TGS calculated as a vector sum of the longitudinal grip force FG and the lateral acceleration LG by the total grip detecting means M2.

TABLE 1

| TGS | −0.4 | −0.6 | −0.8 | −1.0 | 1.0− |
|---|---|---|---|---|---|
| MUTG | (0) | (1) | (2) | (3) | (4) |

As apparent from Table 1, the estimated road surface friction coefficient MUTG is set at five stages (0), (1), (2), (3) and (4) for every total grip force TGS, and the magnitude of the estimated road surface friction coefficient MUTG during turning of the vehicle is determined based on the total grip force TGS. At step S4, only when an estimated road surface friction coefficient MUTG larger than the current estimated road surface friction coefficient MUTG is selected, such estimated road surface friction coefficient MUTG is renewed.

If it is decided based on the output from the steering angle detecting means 3 that the vehicle is in a straight traveling state (at step S6), the estimated road surface friction coefficient MUTG is searched based on the longitudinal grip force FG from Table 2 stored in the read only memory 22 (at step S7).

TABLE 2

| FG | −0.2 | −0.4 | −0.6 | −0.8 | 0.8− |
|---|---|---|---|---|---|
| MUFG | (0) | (1) | (2) | (3) | (4) |

As apparent from Table 2, the estimated road surface friction coefficient MUFG is set at five stages (0), (1), (2), (3) and (4) for every total grip force FG, and the magnitude of the estimated road surface friction coefficient MUFG during turning of the vehicle is determined based on the longitudinal grip force FG. At step S7, only when an estimated road surface friction coefficient MUFG larger than the current estimated road surface friction coefficient MUFG is selected, such estimated road surface friction coefficient MUFG is renewed.

On the other hand, at step S5, the estimated road surface friction coefficient MUTG is searched from Table 1, based on the total grip force calculated as a vector sum of the longitudinal grip force FG and the lateral acceleration LG, but the step S5 is different from step S4 in that the estimated road surface friction coefficient MUTG is renewed in accordance with the occasional total grip force TGS.

If it is decided, based on the output from the steering angle detecting means 3, that the vehicle is in a straight traveling state (at step S8), an estimated road surface friction coefficient MUFG is searched from Table 2, based on the longitudinal grip force FG (at step S9), but step S9 is different from step S7 in that the estimated road surface friction coefficient MUFG is renewed in accordance with the occasional longitudinal grip force FG.

As apparent from comparison of Table 1 with Table 2, the estimated road surface friction coefficients MUTG and MUFG for the same grip forces TGS and FG are set such that MUFG is larger than MUTG. This is for the purpose of conducting the traction control during straight traveling of the vehicle prior to the traction control during turning of the vehicle, and the dignification of both the traction controls can be established as desired depending upon the intended control characteristic.

At steps S10 to S12, the larger one of MUFG and MUTG is selected and defined as a road surface friction coefficient MUCON.

Subsequently, at steps S13 to S15, carried out in a selecting means M3, the larger one of the total grip force TGS and the minimum total grip force TGMIN, searched by applying the road surface friction coefficient MUCON selected in the above manner to Table 3 stored in the read only memory 22, is selected and defined as a final total grip force TG.

TABLE 3

| MUCON | (0) | (1) | (2) | (3) | (4) |
|---|---|---|---|---|---|
| TGMIN | 0.0 | 0.2 | 0.4 | 0.6 | 0.8 |

As described above, the minimum total grip force TGMIN, taking the road surface friction coefficient into consideration, is estimated based on the variation on acceleration of the vehicle, and the larger one of the minimum total grip force TGMIN and the total grip force TGS, determined as the acceleration of the vehicle, is defined as the final controlling total grip force TG. Therefore, even if the total grip force TGS determined as the acceleration of the vehicle is smaller than the actual total grip force due to the larger road surface friction coefficient, a correct value provided taking the road surface friction coefficient into consideration can be estimated as the final total grip force TG to appropriately conduct the traction control.

Although the embodiment of the present invention has been described in detail, it will be understood that the present invention is not limited to the above-described embodiment, and various modifications in design may be made without departing from the spirit and scope of the invention defined in claims.

What is claimed is:

1. A total grip force estimating system for a vehicle, comprising:
   a total grip force detecting means for detecting, as a first total grip force, an acceleration of the vehicle from longitudinal and lateral accelerations:
   a total grip force estimating means for estimating a second total grip force, during a straight travel of the vehicle, taking a road surface friction coefficient into consideration, based on a variation in the acceleration of the vehicle; and a selecting means for selecting a larger one of said first and second total grip forces as a total grip force.

2. A slip control system for a vehicle, comprising:

a driven wheel speed calculating means for calculating a speed of a driven wheel of the vehicle;

a follower wheel speed calculating means for calculating a speed of a follower wheel of the vehicle;

a slipping-state determining means for determining a slipping state of the driven wheel by a comparing a slip rate of the driven wheel calculated from said driven wheel speed and said follower wheel speed with a target slip rate; and an engine output control means for controlling an engine output based on the slipping state of the driven wheel, said slip control system further including a total grip force detecting means for detecting, as a first total grip force, an acceleration of the vehicle from longitudinal and lateral accelerations, a total grip force estimating means for estimating a second total grip force, during a straight travel of the vehicle, taking a road surface friction coefficient into consideration, based on a variation in the acceleration of the vehicle, and a selecting means for selecting a larger one of said first and second total grip forces as a total grip force, said target slip rate being corrected based on the selected total grip force.

3. A slip control system for a vehicle according to claim 2, wherein said second total grip force is calculated from the longitudinal acceleration, taking the road surface friction coefficient into consideration during a straight travel of the vehicle.

* * * * *